No. 689,011. Patented Dec. 17, 1901.
A. T. LIDHOLM.
PHOTO DISPLAY CABINET.
(Application filed Dec. 7, 1900.)

(No Model.) 5 Sheets—Sheet 1.

Witnesses
C. H. Turner
Harry Kilgore

Inventor
Alfred T. Lidholm.
By his Attorneys
Williamson & Merchant

No. 689,011. Patented Dec. 17, 1901.
A. T. LIDHOLM.
PHOTO DISPLAY CABINET.
(Application filed Dec. 7, 1900.)

(No Model.) 5 Sheets—Sheet 2.

Witnesses.
C. H. Turner
Harry Kilgore

Inventor.
Alfred T. Lidholm.
By his Attorneys.
Williamson & Merchant

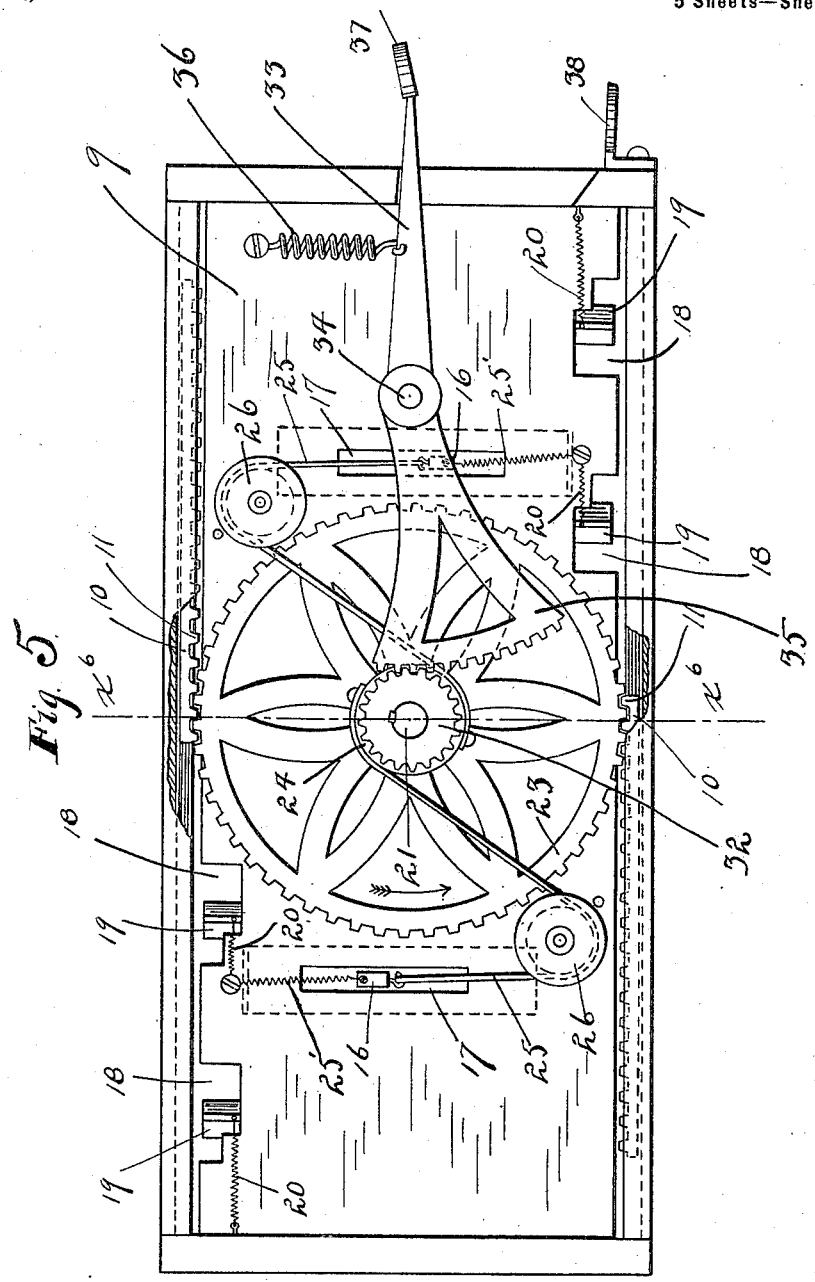

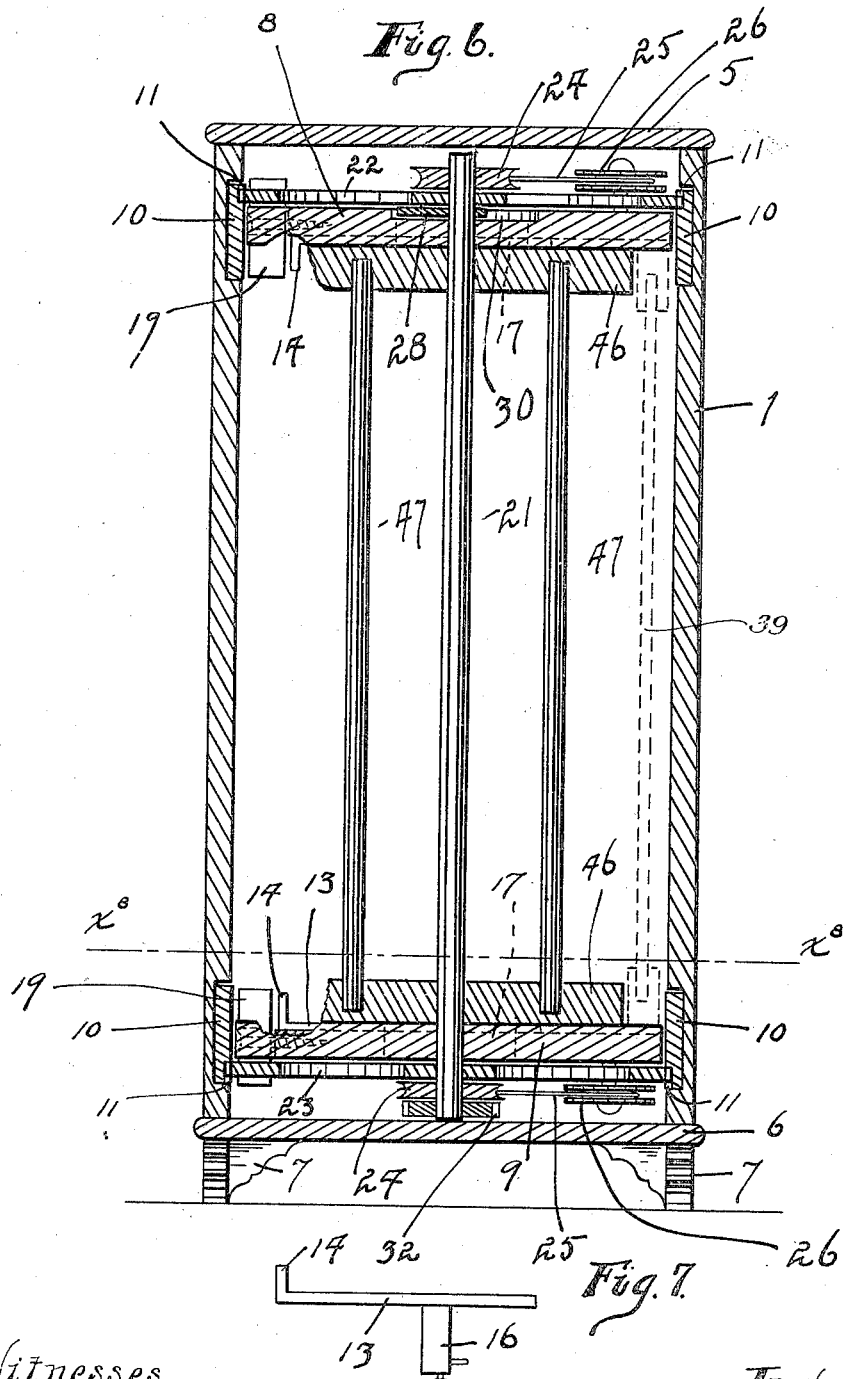

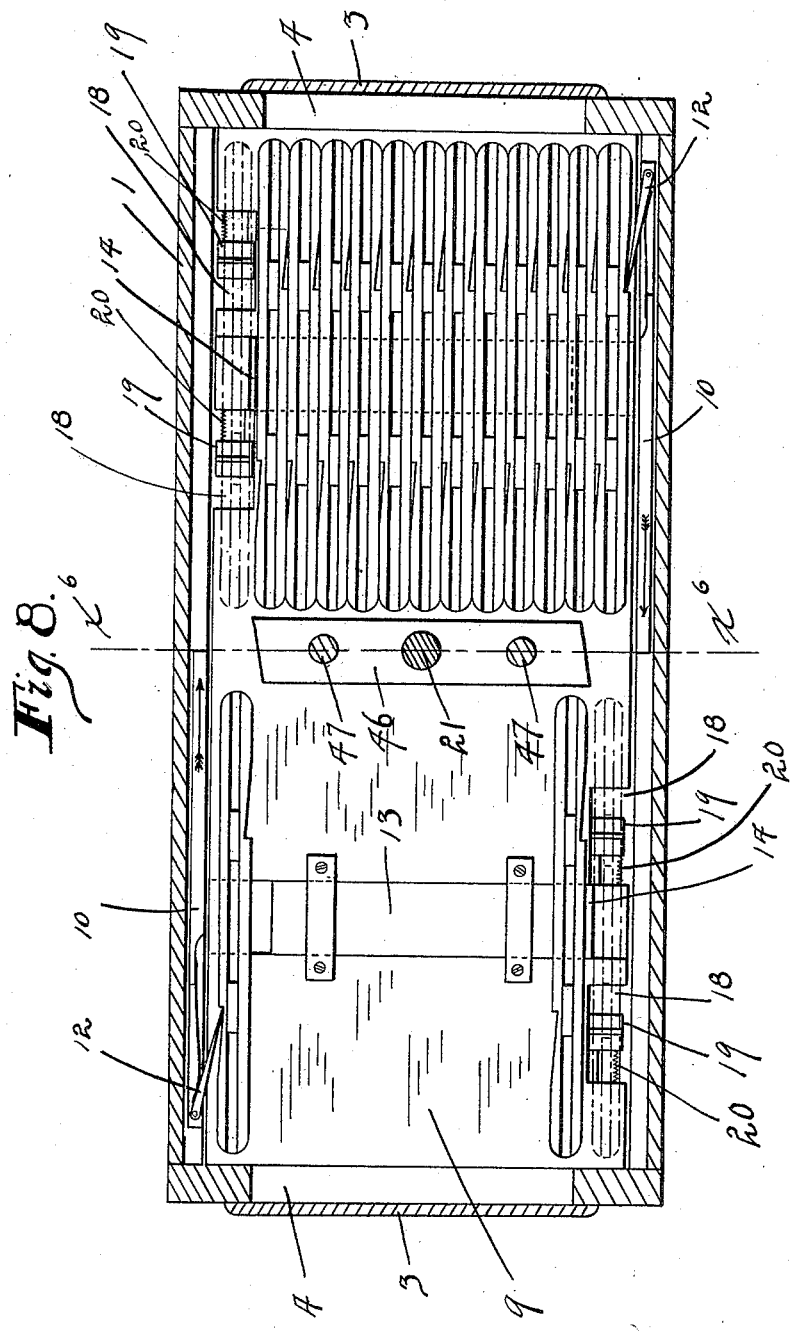

UNITED STATES PATENT OFFICE.

ALFRED T. LIDHOLM, OF MINNEAPOLIS, MINNESOTA, ASSIGNOR OF ONE-HALF TO CHARLES P. WESTON, OF MINNEAPOLIS, MINNESOTA.

PHOTO-DISPLAY CABINET.

SPECIFICATION forming part of Letters Patent No. 689,011, dated December 17, 1901.

Application filed December 7, 1900. Serial No. 38,990. (No model.)

*To all whom it may concern:*

Be it known that I, ALFRED T. LIDHOLM, a citizen of the United States, residing at Minneapolis, in the county of Hennepin and State of Minnesota, have invented certain new and useful Improvements in Photo-Display Cabinets; and I do hereby declare the following to be a full, clear, and exact description of the invention, such as will enable others skilled in the art to which it appertains to make and use the same.

My invention has for its object to provide what I term a "photo-display cabinet," and it is especially designed and arranged to exhibit in succession a series of photographs.

To the above ends the invention consists of the novel devices and combinations of devices hereinafter described, and defined in the claims.

The invention is illustrated in the accompanying drawings, wherein like characters indicate like parts throughout the several views.

Figure 1:
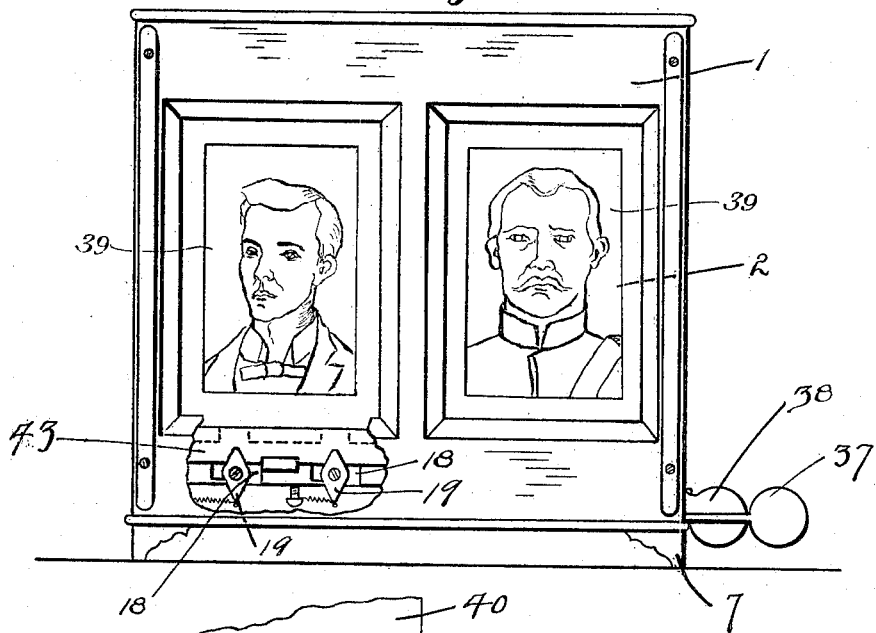
Figure 2:
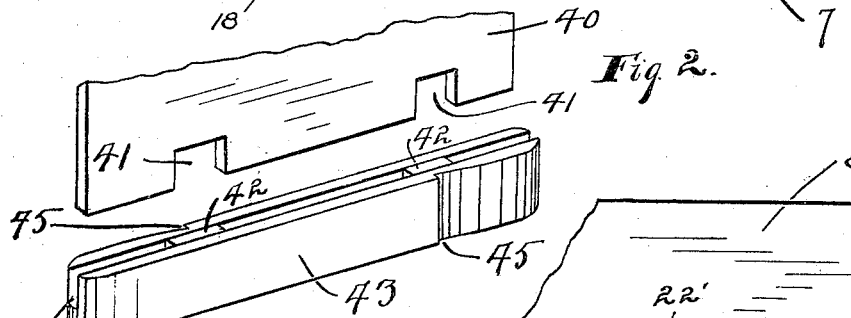
Figure 3:
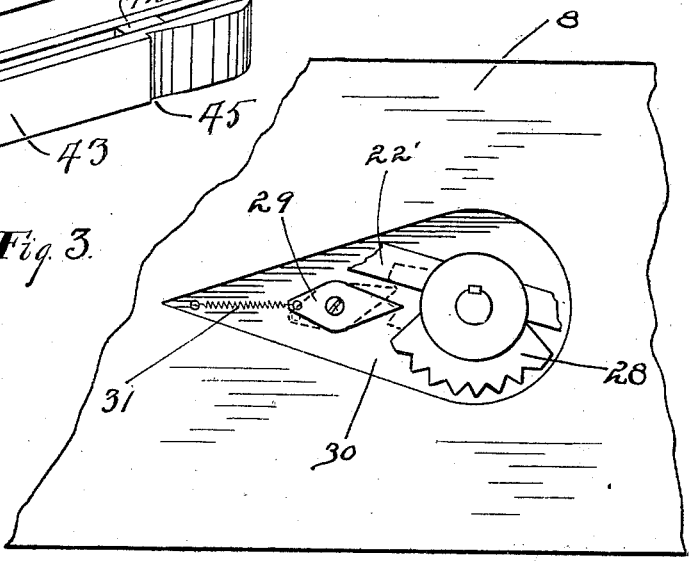
Figure 4:
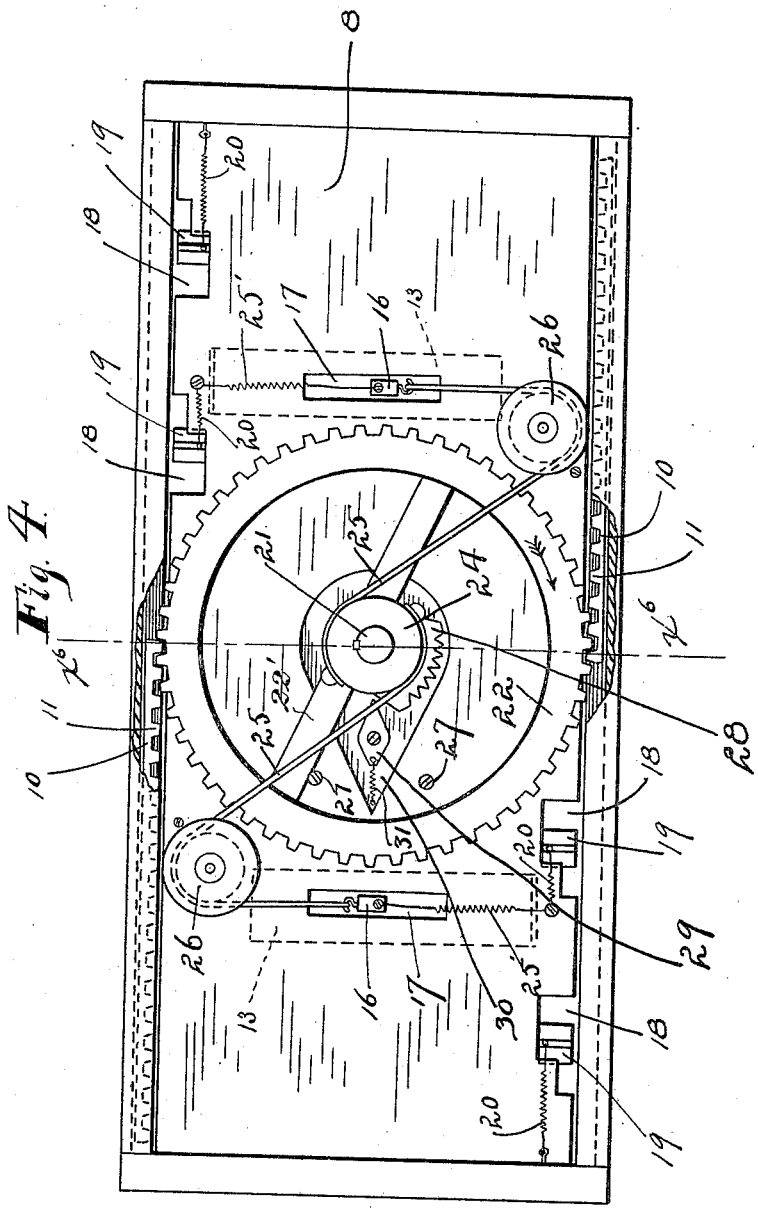

Figure 1 is a front elevation of the so-called "display-cabinet," some parts thereof being broken away. Fig. 2 is a detail in perspective with some parts broken away, showing a portion of one of the photo-holding frames and one of the coöperating end strips or caps. Fig. 3 is a detail in plan showing a portion of the device. Fig. 4 is a plan view of the entire device with the top plate thereof removed and with some parts broken away. Fig. 5 is a bottom plan view of the device with the bottom plate thereof removed and some parts broken away. Fig. 6 is a vertical section on the line $x^6\ x^6$ of Figs. 4 and 5. Fig. 7 is a detail in side elevation, showing one of the so-called "shifting-slides;" and Fig. 8 is a horizontal section on the line $x^8\ x^8$ of Fig. 6, some parts being removed.

The numeral 1 indicates a rectangular case or cabinet provided with four transparent panes 2, located two in the front face thereof and two in the rear face thereof. At its sides the case 1 is provided with removable panels 3, detachably secured in position by any suitable means to temporarily close large openings 4. The case 1 is provided with a removable top plate 5 and with a removable base-plate 6, which, as shown, has supporting-legs 7. A short distance below the top plate 5 and within the case 1 is a horizontally-extended supporting-plate 8, and a short distance above the base-plate 6 is a similar horizontally-extended supporting-plate 9, both of which plates 8 and 9 are suitably secured at their ends to the sides of the case 1.

Located in suitable seats formed in the front and rear plates of the case 1, in line with the edges of the supporting-plates 8 and 9, are four reciprocating rack-bars 10, having teeth 11. These rack-bars 10 are arranged in upper and lower pairs, and they afford what I term generically the "transfer members." These rack-bars 10 have spring-pressed pawls 12. (Best shown in Fig. 8.) The upper pair of pawls 12 work just below the supporting-plate 8, and the lower pair of pawls work just above the lower supporting-plate 9. The pawls at the front of the device extend in the same direction, and the pawls at the rear of said device extend in the same direction with each other, but in a direction reverse to the front pawls. This is done for a purpose which will hereinafter become obvious. Mounted in suitable seats in the top plate 8 is a pair of reversely-reciprocating slides 13, which work at right angles to the rack-bars 10 and are provided with downturned ends 14. The end 14 of the right-hand slide 13 is at the rear of the case, while the end 14 of the left-hand slide depends at the front of the case. These slides 13 are duplicated and mounted to work in suitable seats in the bottom supporting-plate 9; but the ends 14 of these lower slides are turned upward. The upper slides 13 are provided with vertical projections 16, and the lower slides 13 are provided with depending portions 16 of the same construction, which projections 16 work through slots 17 in the supporting-plates 8 and 9.

The forward left-hand portions and the right-hand rear portions of the plates 8 and 9 are cut away at 18 to afford clearance for stop-dogs 19, which are pivoted to the said plates and are yieldingly held in the normal positions (indicated in the drawings) by light coiled springs 20.

Extending vertically through the central portion of the plates 8 and 9 is a shaft 21, provided at its upper end with a spur-gear 22 and at its lower end with a spur-gear 23. The upper gear 22 meshes with the teeth 11 of the upper rack-bars 10, as shown in Fig. 4, and the lower gear 23 meshes with the teeth of the lower rack-bars 10, as shown in Fig. 5. Above the gear 22 and below the gear 23 the shaft 21 is provided with winding drums or pulleys 24, to which the ends of cords or flexible connections 25 are secured, as shown in Figs. 4 and 5. These cords 25 run over suitable guide-sheaves 26 and are attached at their outer ends one to each of the projections 16 of the shifting slides or members 13. It will be noted that the upper gear 22 has a diametrically-projecting arm 22', which engages with stops 27 on the upper plate 8 to limit the oscillations of the two gears 22 and 23 and parts operated thereby.

To prevent the movements of the gears 22 and 23 and shaft 21 from being reversed except at the extremes of their throw, the hub of the said gear 22 is shown as provided with a segmental ratchet or notched flange 28, with which a pivoted pawl 29 on the plate 8 coöperates under either direction of movement of the said ratchet. As shown, both the ratchet 28 and pawl 29 work in a countersunk portion 30 of the plate 8, and the said pawl 27 is subject to a light spring 31, which normally holds the same as indicated by full lines in Figs. 3 and 4.

As the most efficient means for oscillating the rock-shaft 21 and gears 22 and 23 I provide the said shaft at its lower end with a spur-pinion 32 and provide for coöperation therewith an oscillating lever 33, which is pivoted at 34 to the plate 9 and is provided with a segmental gear 35, that meshes with the pinion 32. The lever 33 is subject to a coiled spring 36, which normally holds the same in the position indicated in Fig. 5. The free end of the lever 33 projects out of the case 1 and terminates in a finger-piece 37. The lever 33 is intended to be operated by the pressure of the fingers, and to render this action easy the case 1 is preferably provided with a fixed finger-piece 38, which two finger-pieces may be engaged by the fingers and thumb of the same hand to press the free end of the lever 33 toward the said fixed finger-piece 38. The lever 33 is of course returned to its normal position by the spring 36.

The photographs 39 are placed back to back and held in pairs by frames 40 of rectangular form and of any suitable material, but preferably of cardboard, arranged to hold the photographs in approximately the same manner as the leaf of a photograph-album. At their upper and lower edges the holding-frames 40 are provided with notches 41, which are adapted to receive block portions 42 of upper and lower frame-strips 43, which strips are provided with longitudinal seats 44, which receive the edges of the said frame 40. So far as the broad idea of my invention is concerned the photographs may be held by various other devices, and various kinds of pictures other than photographs may be displayed by the device. To include these several devices and the various pictures, I use as a generic term the expression "display-cards." The frame-strips 43 are provided with shoulders 45, which are adapted to be engaged by the free ends of the pawls 12, carried by the transferring-racks 10, as hereinafter more clearly described.

The display-cards, together with the frame-strips 43, secured to the upper and lower edges thereof, are located in two packs extending in approximately the same direction, as indicated in Fig. 8, in which figure, however, the intermediate members of the left-hand pack are removed to more clearly show other parts of the device.

*Operation.*—Normally the parts stand as indicated in Figs. 1, 4, 5, 6, and 8. By reference to Fig. 8 it will be noted that the pawls 12 normally engage the coöperating notches 45 of the outer frame-strips 43. To shift the photographs, the operator presses the free end 37 of the lever 33 to its limit in the direction of the fixed finger-piece 38, and this movement of the said lever and its segmental gear 35 will move the gears 22 and 23 in the direction of the arrows marked on Figs. 4 and 5. This movement of the said gears simultaneously moves the four rack-bars 10 in the directions indicated by the arrows marked thereon in Fig. 8, and by these movements of the said racks and their pawls 12 the forward member of the right-hand stack of display-cards and the rear member of the left-hand stack thereof are simultaneously moved, together with their frame-strips 43, into the positions indicated by dotted lines in Fig. 8. As the display-cards and their frames 43 are shifted from the one pack to the other they pass onto the inner ends of the stop-dogs 19 and force them out of their paths. Under the movements of the gears 22 and 23, above described, the cords 25 are slackened, and the springs 25' are then permitted to become active to move the shifting-slides 13 so that their bent ends 14 temporarily stand outward of the coöperating stop-dogs 19, and this movement takes place at a time before the display-cards and their frame-strips 43 have been shifted from the one side to the other, from which it follows that the said strips when transferred from the one stack to the other will pass inward of the said ends 14 of said slides 13. When the lever 33 is released or permitted to make its return movement under the action of its spring 36, the transferring rack-bars 10 are returned to the positions indicated in Figs. 4, 5, and 8, and by the final portion of the return movement of the shaft 21, gears 22 and 23, and drums 24 the cords 25 are again drawn taut, and through them the shifting slides 13 are drawn inward and back to their normal positions. (Indicated in Fig. 8.) These return movements of the said slides 13 serve to simultaneously draw inward in reverse lateral directions the two display-cards which were just previously passed over the stop-dogs 19. As soon as the slides 43 of the said display-card are moved laterally inward or rearward of the dogs 19 the said dogs fly back to their normal position (indicated in Fig. 1) and then serve as stops to hold in the said display-cards and frame-strips packed tightly together and against forward or return lateral movements. It is evident that by repeating the operations above described the photographs may be exhibited in succession. In the illustration given twenty-four display-cards are shown, from which it follows that forty-eight photographs may be displayed. This number may, however, be increased or decreased at will simply by making the device narrower or wider. The display-cards and their frame-strips may be placed within the case and removed through the openings 4 when the panels 3 are removed. In the construction shown the supporting-plates 8 and 9 are respectively provided with stop-strips 46, which space apart the two stacks of display-cards, and also, as shown, vertical stay-rods 47 connect the upper and lower spacing-bars 46. The initial movement of the shaft 21 and its gears 22 23 carries the segmental ratchet 28 into engagement with the free end of the pivoted pawl 29. The said pawl then acts to prevent return movement of the said shaft and gears until after the said ratchet has been carried completely past the said pawl, whereupon the pawl assumes its normal position and is ready for a similar action under a reverse movement of the parts. My improved device, above described, operates in a similar manner, both on the top and bottom portions of the pictures and their holders. For instance, when the pictures are shifted edgewise the holders 43 at the top and bottom of the picture are both engaged by driving-pawls 12. When the packs of pictures are moved laterally, they are acted upon both at the top and bottom by the flanges 14 of the shifting-slides 13, and when the said packs are thus shifted laterally the lock-dogs 19, both at the top and bottom of the pictures are thrown in front of the packs to hold the same rearward or inward of the said dogs. This arrangement is very important, and I believe it to be the only way in which the pictures may be moved accurately and with certainty.

This apparatus will shift the photographs in rapid succession and has the advantage over albums and many other devices in that it protects the photographs from dirt and prevents them from being scratched by rubbing together.

It will of course be understood that the device above described is capable of many modifications within the scope of my invention.

What I claim, and desire to secure by Letters Patent of the United States, is as follows:

1. The combination with a suitable case, adapted to contain display-cards arranged in two packs, of upper and lower transferring elements, connected for simultaneous movement for action on the upper and lower portions of said display-cards to move the same from one pack to the other, reciprocating shifting-slides arranged in pairs having upper and lower members, the said pairs operating in reverse directions and acting on the upper and lower portions of said display-cards, to move the same laterally, and yielding stop-dogs arranged in sets having upper and lower members, which stop-dogs are mounted to move only in the plane of the transferring or edgewise movement of the said cards and are adapted to yield when a display-card is moved edgewise from one pack to the other and against the same, and are adapted to fall in front of the upper and lower portions of the said display-card, when the same is moved laterally inward of the same, by said shifting-slides, substantially as described.

2. The combination with a suitable case adapted to contain display-cards arranged in two packs, for reciprocating transferring elements arranged in pairs having upper and lower members, reciprocating shifting-slides arranged in pairs having upper and lower members, which pairs of shifting-slides work reversely and transversely of said shifting elements, a rock-shaft extending centrally through said case and provided with connections for operating said transferring elements and shifting-slides whereby the same acts simultaneously on the upper and lower portions of said display-cards, and yielding stop-dogs 19 mounted on pivots that extend at right angles to the plane of transferring or edgewise movement of said cards arranged for simultaneous actions on the upper and lower portions of said display-cards which stop-dogs are so positioned that they will be engaged and depressed by the display-cards which are being transferred, and will then spring in front of the same and act as stops when the said display-cards are moved laterally inward, by said shifting-slides, substantially as described.

In testimony whereof I affix my signature in presence of two witnesses.

ALFRED T. LIDHOLM.

Witnesses:
F. D. MERCHANT,
CHARLES P. WESTON.